United States Patent
Yoda et al.

(10) Patent No.: US 7,634,130 B2
(45) Date of Patent: Dec. 15, 2009

(54) MOVING IMAGE GENERATING APPARATUS, MOVING IMAGE GENERATING METHOD AND MOVING IMAGE GENERATING PROGRAM

(75) Inventors: Akira Yoda, Kanagawa (JP); Kensuke Terakawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 738 days.

(21) Appl. No.: 10/949,221

(22) Filed: Sep. 27, 2004

(65) Prior Publication Data

US 2005/0094869 A1    May 5, 2005

(30) Foreign Application Priority Data

Sep. 25, 2003    (JP) .............................. 2003-333055
Jun. 28, 2004    (JP) .............................. 2004-190230

(51) Int. Cl.
G06K 9/00    (2006.01)
G06K 9/32    (2006.01)
H04N 13/02   (2006.01)
H04N 13/04   (2006.01)

(52) U.S. Cl. ...................... 382/154; 382/300; 348/47; 348/48; 348/55

(58) Field of Classification Search .................. 348/42, 348/47, 48, 55; 382/154, 300; 396/153, 396/324, 325
See application file for complete search history.

(56) References Cited

U.S. PATENT DOCUMENTS 3,682,064 A * 8/1972 Matsunaga et al. .......... 396/325

| 4,453,182 A | * | 6/1984 | Wilkinson et al. | .......... 348/159 |
| 5,745,126 A | * | 4/1998 | Jain et al. | .................... 382/154 |
| 5,872,590 A | * | 2/1999 | Aritake et al. | ................. 348/57 |

(Continued)

FOREIGN PATENT DOCUMENTS

JP    03-135182 A    6/1991

(Continued)

OTHER PUBLICATIONS

Yoshida, et al. "Real-Time Stereo Vision with Multiple Arrayed Camera." Robotics and Automation, 1992. Proceedings., 1992 IEEE International Conference on 2(1992): 1765-1769.*

(Continued)

*Primary Examiner*—Matthew C Bella
*Assistant Examiner*—Michael A Newman
(74) *Attorney, Agent, or Firm*—Sughrue Mion, PLLC

(57) ABSTRACT

A moving image generating apparatus for generating three-dimensional moving image to display a subject as a three-dimensional object, comprises a plurality of two-dimensional moving image generators, and each of the two-dimensional moving image generators is provided to each position, of which relative positions with respect to each of the two-dimensional moving image generators is predetermined respectively, and captures the subject at different timing intermittently, so that each of the two-dimensional moving image generators generating two-dimensional captured moving image respectively, and a three-dimensional moving image generator operable to generate the three-dimensional moving image of which frame rate is higher than a frame rate of the two-dimensional captured moving image, based on both the relative positions of the plurality of two-dimensional moving image generator and the two-dimensional captured moving images generated by the two-dimensional moving image generators.

20 Claims, 12 Drawing Sheets

U.S. PATENT DOCUMENTS

| | | | |
|---|---|---|---|
| 6,052,539 A * | 4/2000 | Latorre | 396/263 |
| 6,335,977 B1 * | 1/2002 | Kage | 382/107 |
| 6,340,991 B1 * | 1/2002 | Chen et al. | 348/513 |
| 6,445,815 B1 * | 9/2002 | Sato | 382/154 |
| 6,556,236 B1 * | 4/2003 | Swift et al. | 348/56 |
| 6,594,313 B1 * | 7/2003 | Hazra et al. | 375/240.16 |
| 6,789,039 B1 * | 9/2004 | Krumm | 702/150 |
| 6,965,690 B2 * | 11/2005 | Matsumoto | 382/154 |
| 7,184,030 B2 * | 2/2007 | McCharles et al. | 345/173 |
| 2001/0028399 A1 * | 10/2001 | Conley | 348/239 |
| 2002/0094135 A1 * | 7/2002 | Caspi et al. | 382/294 |
| 2003/0223499 A1 * | 12/2003 | Routhier et al. | 375/240.25 |
| 2004/0091046 A1 * | 5/2004 | Akimoto et al. | 375/240.12 |
| 2004/0246336 A1 * | 12/2004 | Kelly et al. | 348/143 |

FOREIGN PATENT DOCUMENTS

| | | | |
|---|---|---|---|
| JP | 06-086332 A | 3/1994 | |
| JP | 07-162744 A | 6/1995 | |
| JP | 07-296195 A | 11/1995 | |
| JP | 09-065374 A | 3/1997 | |

OTHER PUBLICATIONS

Shieh, et al. "Motion estimation from a sequence of stereo images: a direct method." Systems, Man and Cybernetics, IEEE Transactions on 24(1994): 1044-1053.*

Vedula, Sundar, Simon Baker, and Takeo Kanade. "Spatio-temporal view interpolation." ACM International Conference Proceeding Series; ACM International Conference Proceeding Series; vol. 28 archive Proceedings of the 13th Eurographics workshop on Rendering 28(2002): 65-76.*

Akihiko Kitano, "3-dimensionality shapes recognition Method Using Multitude Image", (2000).

* cited by examiner

| INDEX | | | | |
|---|---|---|---|---|
| | 1 | 2 | 3 | ... |
| CAMERA 102a | $A_1$ | $A_2$ | $A_3$ | ... |
| CAMERA 102b | $B_1$ | $B_2$ | $B_3$ | ... |
| CAMERA 102c | $C_1$ | $C_2$ | $C_3$ | ... |

*FIG. 11*

MOVING IMAGE GENERATING APPARATUS, MOVING IMAGE GENERATING METHOD AND MOVING IMAGE GENERATING PROGRAM

This patent application claims priorities on Japanese Patent Applications, 2003-333055 filed on Sep. 25, 2003 and 2004-190230 filed on Jun. 28, 2004 the contents of which are incorporated herein by reference.

BACKGROUND OF THE INVENTION

1. Field of the Invention

The present invention relates to a moving image generating apparatus, a moving image generating method, and a moving image generating program. More particularly, the present invention relates to the moving image generating for displaying a subject as a three-dimensional object.

2. Description of the Related Art

Conventionally, a method for generating three-dimensional image by using stereographic technique based on two-dimensional images captured by two cameras is well known. (For example, see the article from the Information Technology Research Institute of Nagano Prefecture's web site, entitled "three-dimensionality shapes recognition Method Using Multitude Image"). It is also possible to generate three-dimensional moving image based on two-dimensional images captured by two cameras. For example, it is possible to change a viewpoint of a subject according to a user's instruction. Therefore, for example, it is expected to deliver the three-dimensional moving image including sports images.

When watching the sports images, smooth slow motion replay is sometimes needed in order to observe the detail movement of the subject. In order to replay images in smooth slow motion, it is necessary to generate moving images in high frame rate. However, when generating the moving images in high frame rate, it is needed to prepare two cameras having the capacity of capturing with high frame rate, therefore, its cost may be expensive.

SUMMARY OF THE INVENTION

Therefore, it is an object of the present invention to provide a moving image generating apparatus, a moving image generating method, and a moving image generating program, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, a moving image generating apparatus for generating three-dimensional moving image to display a subject as a three-dimensional object, comprises a plurality of two-dimensional moving image generators, and each of the two-dimensional moving image generators is provided to each position, of which relative positions with respect to each of the two-dimensional moving image generators is predetermined respectively, and captures the subject at different timing intermittently, so that each of the two-dimensional moving image generators generating two-dimensional captured moving image respectively, and a three-dimensional moving image generator operable to generate the three-dimensional moving image of which frame rate is higher than a frame rate of the two-dimensional captured moving image, based on both the relative positions of the plurality of two-dimensional moving image generator and the two-dimensional captured moving images generated by the two-dimensional moving image generators.

The two-dimensional captured moving image may include a plurality of captured frames which is obtained intermittently and sequentially, and while the two-dimensional moving image generator captures two consecutive captured frames, the other the two-dimensional moving image generators may capture one captured frame. The three-dimensional moving image generator may include an interpolated frame generator operable to generate an interpolated frame to be inserted between the two captured frames, by interpolating between the two captured frames obtained by the two-dimensional moving image generator, a three-dimensional object generator operable to generate a three-dimensional object of the subject, based on both the interpolated frame inserted between the two captured frames which are obtained by the two-dimensional moving image generator and the one captured frame obtained by the other two dimensional moving image generators, and a moving image processing unit operable to generate the three-dimensional moving image based on the three-dimensional object received from the three-dimensional object generating unit sequentially.

The moving image generating apparatus may further comprise equal to or more than three of the two-dimensional moving image generators, and each of the two-dimensional moving image generators may capture the subject at each timing when the subject is not captured by the other two-dimensional moving image generator, so that each of the two-dimensional moving image generators generates the two dimensional captured moving image at such timing that is complementary to the timing when each of the two-dimensional captured moving image is generated by the other two-dimensional moving image generates; and the three-dimensional moving image generator may generate the three-dimensional moving image having a frame rate that is equal to a frame rate of the two-dimensional captured moving image multiplied by the number of the two-dimensional moving image generators, based on the two-dimensional captured moving image received from the equal to or more than three two-dimensional moving image generators.

The two-dimensional captured moving image may include a plurality of captured frames which is obtained intermittently and sequentially, and the three-dimensional moving image generator may include a three-dimensional object generator operable to generate three-dimensional object of the subject based on the two-dimensional captured moving image generated by at least the two two-dimensional moving image generators, an object transforming unit operable to generate the three-dimensional object of the subject at each of the timings when each of the captured frames is obtained, by transforming the three-dimensional object generated by the three-dimensional object generator, based on both relative positions of each of the two-dimensional moving image generators with respect to at least two of the two-dimensional moving image generators and each of the captured frames, corresponding to each of the captured frames generated by at least two of the two dimensional moving image generators and a moving image processing unit operable to generate the three-dimensional moving image based on the three-dimensional object generated by the three-dimensional object generator and the object transforming unit.

The moving image processing unit may receive an input of a viewpoint from which the subject is observed, and generates the three-dimensional moving image when the subjects is observed from the viewpoint.

The moving image generating apparatus may further comprise an image storing unit operable to store the two-dimensional captured moving image generated by the two-dimensional moving image generators, and the image storing unit may store the two-dimensional captured moving images, in an order of the timings when the two-dimensional moving image generators capture, in every the two-dimensional moving image generator.

The image storing unit may be provided every the two-dimensional moving image generator, and the moving image generating apparatus may further comprise a time announcing unit operable to announce time to the two-dimensional moving image generators.

The moving image generating apparatus may further comprise an image storing unit operable to store the two-dimensional captured moving image generated by the two-dimensional moving image generators, and the image storing unit may store the two-dimensional captured moving images of the two-dimensional moving image generators, in an order of the timings when the two-dimensional moving image generators capture.

The moving image generating apparatus may further comprise a time announcing unit operable to announce a time to the two-dimensional moving image generators.

According to the second aspect of the present invention, a moving image generating method for generating three-dimensional moving image to display a subject as a three-dimensional object, comprises steps of capturing the subject at different timing intermittently, thereby generating a two-dimensional captured moving image respectively by using a plurality of two-dimensional moving image generators, each of which is provided to each position, of which relative positions with respect to each of the two-dimensional moving image generators is predetermined respectively, and generating the three-dimensional moving image of which frame rate is higher than a frame rate of the two-dimensional captured moving image, based on both the relative positions of the plurality of two-dimensional moving image generators and the two-dimensional captured moving image generated by the two-dimensional moving image generators.

According to the third aspect of the present invention, a recording medium storing a computer program for generating three-dimensional moving image to display a subject as a three-dimensional object, the program comprises a two-dimensional moving image generating module operable to capture the subject at different timing intermittently, thereby generating a two-dimensional captured moving image respectively by using a plurality of two-dimensional moving image generators, each of which is provided to each position, of which relative positions with respect to each of the two-dimensional moving image generators is predetermined respectively and a three-dimensional moving image generating module operable to generate the three-dimensional moving image of which frame rate is higher than a frame rate of the two-dimensional captured moving image, based on both the relative positions of the plurality of two-dimensional moving image generators and the two-dimensional captured moving image generated by the two-dimensional moving image generators.

The summary of the invention does not necessarily describe all necessary features of the present invention. The present invention may also be a sub-combination of the features described above.

BRIEF DESCRIPTION OF THE DRAWINGS

FIG. 11 is a schematic drawing showing a data structure stored in the image storing unit 130.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
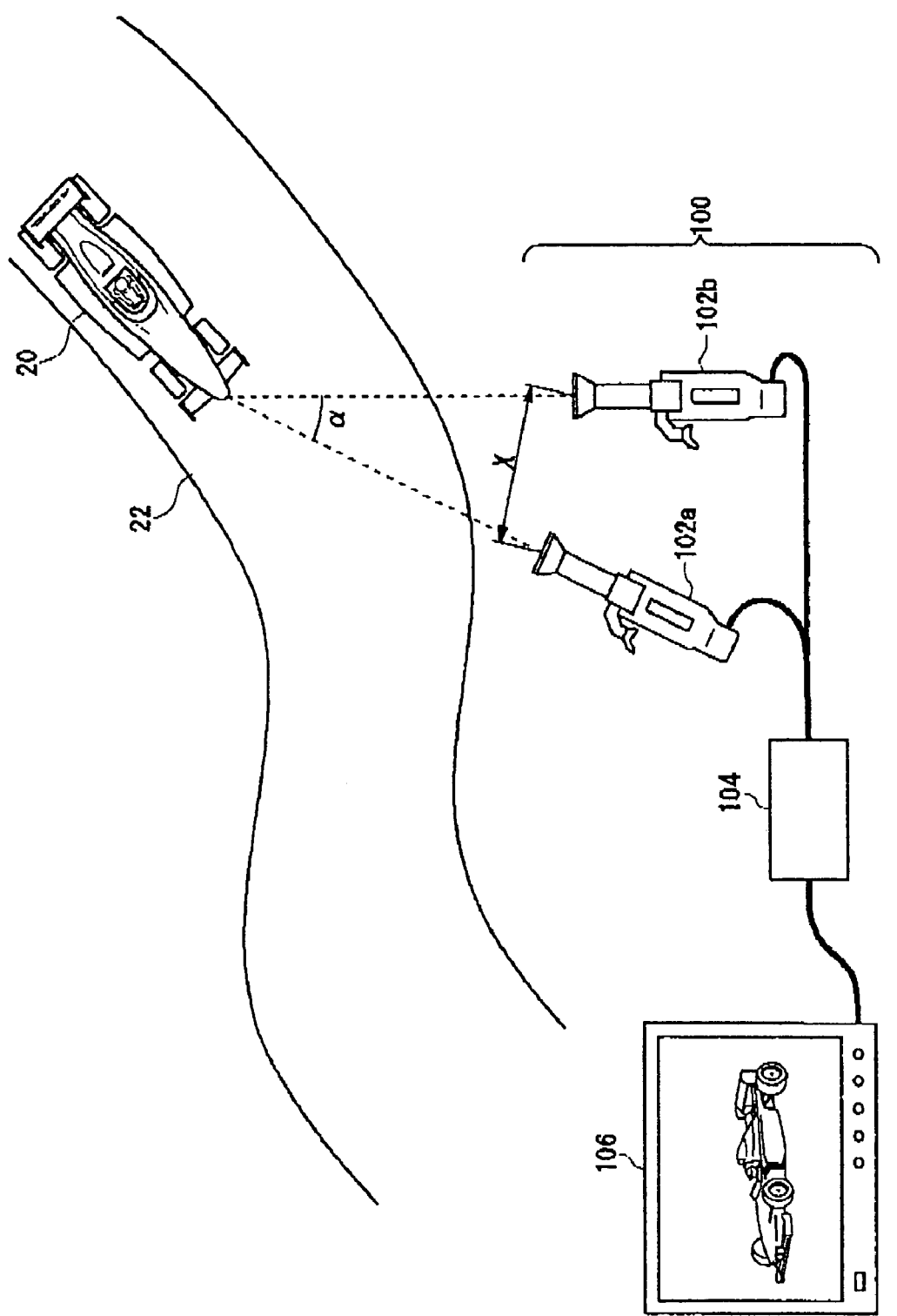
FIG. 1 is an example of the overview of a moving image generating apparatus 100 according to an embodiment of the present invention.

FIG. 1 is an example of the overview of a moving image generating apparatus 100 according to an embodiment of the present invention. It is an object for the present moving image generating apparatus 100 to generate three-dimensional moving images with high frame rate in an appropriate manner. The moving image generating apparatus 100 includes a camera 102a, a camera 102b, a three-dimensional moving image generator 104 and a display 106.

Each of the camera 102a and the camera 102b is provided at each position, of which relative position with respect to the camera 102a and the camera 102b is predetermined respectively, and captures a subject intermittently at each timing, which is different from each other. Thus, the camera 102a and the camera 102b generate two-dimensional captured moving images respectively. For example, each of the cameras 102a-b captures an automobile 20 running on a road 22 rapidly from each position. The cameras 102a-b capture the automobile 20 alternately. For example, each of the cameras 102a-b captures the automobile 20 respectively with a phase shift of one-half frame. Each of the camera 102a and the camera 102b is an example of the two-dimensional moving image generator.

The three-dimensional moving image generator 104 generates the three-dimensional dimensional moving image of the automobile 20, based on both the relative positions of the cameras 102a-b and the captured moving image generated by the cameras 102a-b. In this example, the three-dimensional moving image generator 104 generates the three-dimensional dimensional moving image, based on both the distance X between the camera 102a and the camera 102b, and the angle (z formed between a line from the camera 102a to the automobile 20 and a line from the camera 102b to the automobile 20. Here, the automobile 20 is an example of the subject. In addition, the three-dimensional moving image may be a moving image for displaying the subject as a three-dimensional object. The three-dimensional moving image may be a moving image by three-dimensional computer graphics. In this example, the three-dimensional moving image generator 104 generate the three-dimensional image, of which frame rate is higher than a frame rate of the captured moving image, by using the method described below.

The display 106 is an apparatus for displaying the three-dimensional moving image generated by the three-dimensional moving image generator 104. In this example, the display 106 is a three-dimensional display for displaying, a three-dimensional object included in the three-dimensional moving image. In addition, the display 106 displays the three-dimensional moving images in slow motion, for example, according to the instruction of a user. For example, the display 106 may project the three-dimensional objects included in the three-dimensional moving image to a display surface, so that the display 106 may display the three-dimensional moving image.

Figure 2:
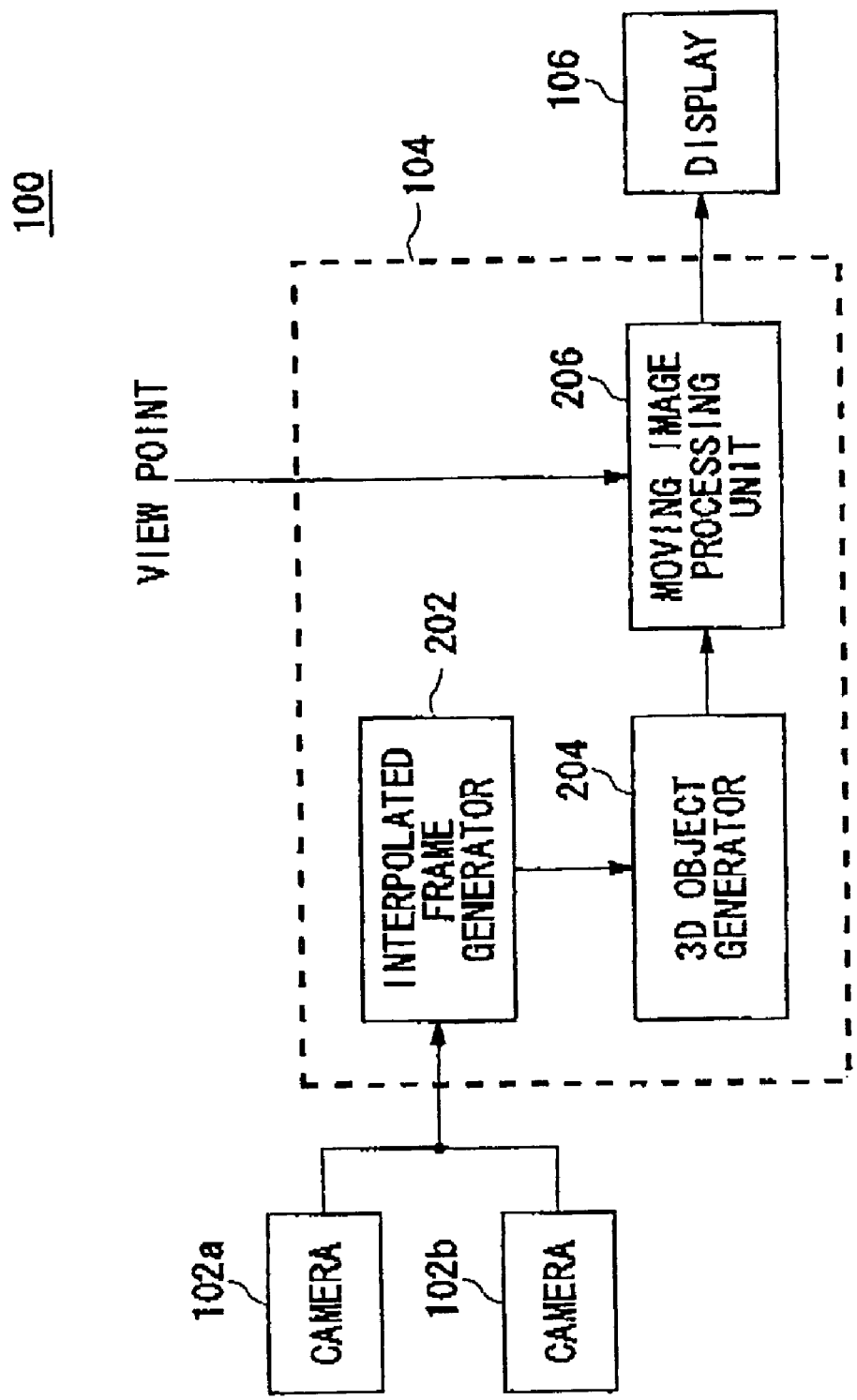
FIG. 2 is an example of the detailed configuration of the moving image generating apparatus 100.

FIG. 2 is an example of the detailed configuration of the moving image generating apparatus 100. In this example each of the cameras 102a-b captures the subject alternately, so that each of the cameras 102a-b generates the captured moving images including a plurality of captured frames that is obtained intermittently and sequentially. In this case, while one of the cameras 102a-b captures two consecutive captured frames, the other of cameras 102a-b obtains one captured frame.

The three-dimensional moving image generator 104 includes an interpolated frame generator 202, a three-dimensional object generator 204, and a moving image processing unit 206. The interpolated frame generator 202 generates an interpolated frame that corresponds to the captured moving images. The interpolated frame is a frame in order to interpolate between the captured frames in the captured moving images. The interpolated frame generator 202 generates the interpolated frame to be inserted between the two consecutive captured frames, by interpolating between the two captured frames. Therefore, the interpolated frame generator 202 generates an interpolated moving image including both the captured frames that are captured by the camera 102a and the interpolated frames that interpolate these captured frames.

Moreover, in a similar way, the interpolated frame generator 202 generates the interpolated frames for the captured moving images generated by the camera 102b. Therefore, the interpolated free generator 202 generates an interpolated moving image including both the captured frames that are captured by the camera 102b and the interpolated frames that interpolate these captured frames.

In addition, the interpolated frame generator 202 may generate the interpolated frames by using the well-known method for interpolating the frames, which is used in a case of changing the rate of the moving images. Accordingly, the interpolated frame generator 202 generates two interpolated moving images of which frame rate is twice as high as that of the captured moving image. The interpolated frame generator 202 may further interpolate between the captured frames obtained by one of the cameras 102a-b, based on the captured frames obtained by the other of the cameras 102a-b. In this case, it is possible to generate the interpolated frames in a further appropriate manner.

The three-dimensional object generator 204 generates the three-dimensional object of the subject, based on the two interpolated moving images received from the interpolated frame generator 202. The three-dimensional object generator 204 generates the three-dimensional object by applying the stereoscopic method to both the captured frame included in one interpolated moving image and interpolated frame included in the other interpolated moving image. The three-dimensional object generator 204 generates the three dimensional objects sequentially based on each of the captured frames and interpolated frames included in the interpolated moving images, and then supplies them to the moving image processing unit 206. The three-dimensional object generator 204 may generate a three-dimensional computer graphics object, representing the subject as the three-dimensional object.

The moving image processing unit 206 generates the three-dimensional moving images based on the three-dimensional objects received from the three-dimensional object generator 204 sequentially. The moving image processing unit 206 generates each frame of the three-dimensional object, corresponding to each frame of the interpolated moving images, so that the moving image processing unit 206 generates the three-dimensional moving images of which frame number is equal to that of the interpolated moving images. Thus, the three-dimensional object generator 204 generates the three-dimensional moving images of which frame number is twice as many as that of the captured moving images obtained by the camera 102a and the camera 102b. The moving image processing unit 206 supplies the generated three-dimensional moving images to the display 106. The display 106 displays the three-dimensional moving images received from the moving image processing unit 206. According to this example, it is possible to generate the three-dimensional moving images with the high frame rate appropriately.

Figure 3:
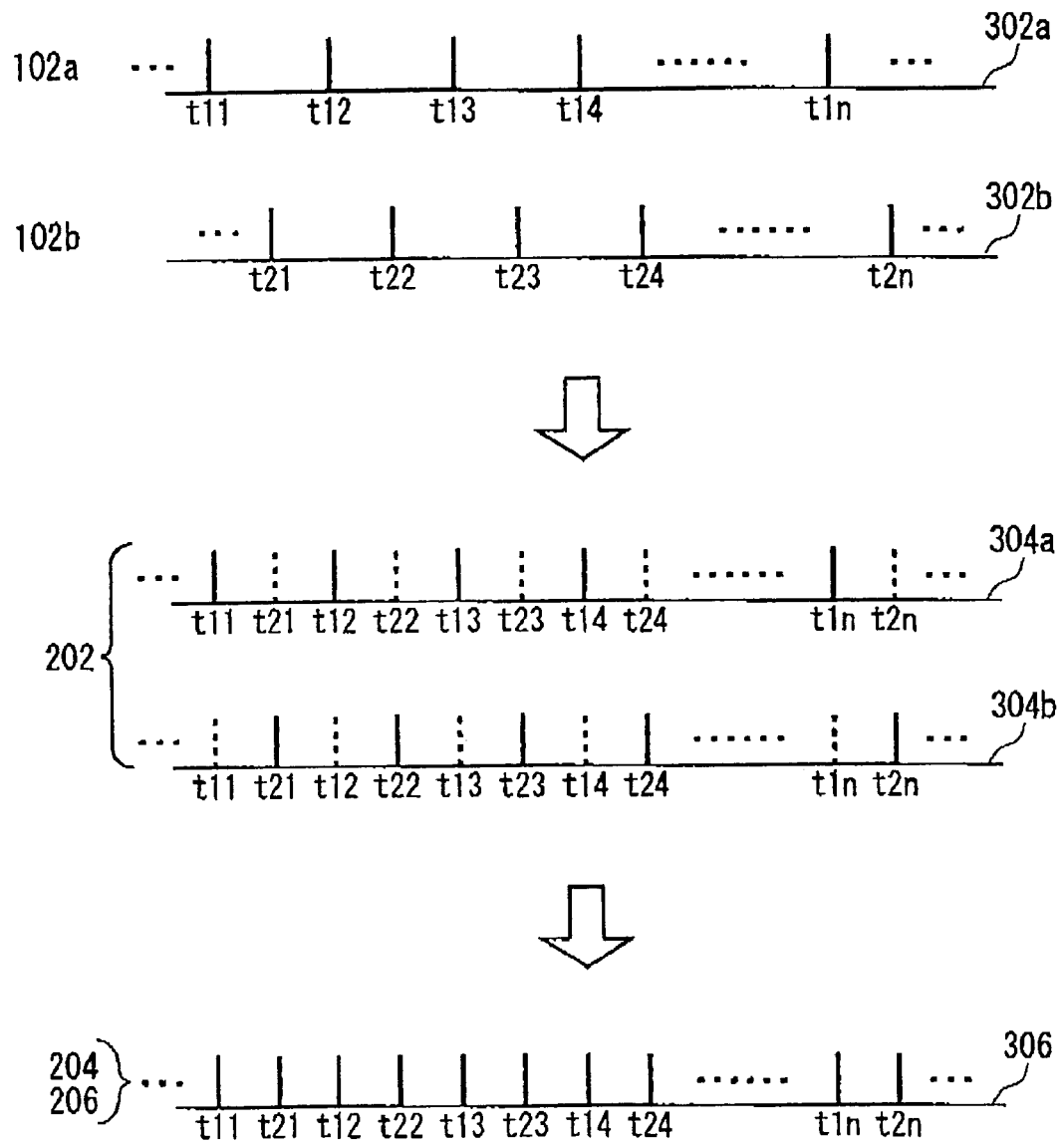
FIG. 3 is an explanatory drawing showing an example of the operation of the moving image generating apparatus 100.

FIG. 3 is an explanatory drawing showing an example of the operation of the moving image generating apparatus 100. In this example, the camera 102a captures the subject intermittently by obtaining the captured frames at the timings repeated at regular intervals, such as the timing t11, t12, . . . and t1n, shown with continuous line in the drawing, so that the camera 102a generates the captured moving image 302a. In a similar way, the camera 102b generates the captured moving image 302b by obtaining the captured frames at the timings t21, . . . , and t2n. Each of the timings t1, t12, t1n, t21, . . . , and t2n is a timing measured from a reference timing when the camera 102a and the camera 102b start cape coinstantaneously. It is preferable that the timing t21 is at the middle timing between the t11 and the t12. In this example, both the camera 102a and the camera 102b acquires full images that is not interlaced, as each of the captured frame in the captured moving images.

The interpolated frame generator 202 generates the interpolated moving image 304a by inserting the interpolated frames among the captured frames. The interpolated frame generator 202 adds each interpolated fame to each of the timings t21, t22, . . . , and t2n, so that the interpolated frame generator 202 generates the interpolated moving image 304a. Moreover, the interpolated frame generator 202 adds each interpolated frame to the captured moving image 302b at each of the timings t1, t12, . . . , and t1n, so that the interpolated frame generator 202 generates the interpolated moving image 304b.

The three-dimensional object generator 204 and the moving image processing unit 206 generate a three-dimensional moving image 306 based on the interpolated moving images 304a-b. In this example, the three-dimensional object generator 204 generates the three-dimensional objects corresponding to one frame in the three-dimensional moving image, by applying the stereoscopic method to both the captured frame in the interpolated moving image 304a and the interpolated frame in the interpolated moving image 304b. For example, the three-dimensional object generator 204 generates one three-dimensional object based on both the captured frame of the interpolated moving image 304a at the timing t11 and the interpolated frame of the interpolated moving image 304b at the timing t11. Moreover, the three-dimensional object generator 204 generates the three-dimensional object corresponding to one frame in the three-dimensional moving image, by applying the stereoscopic method to both the interpolated frame in the interpolated moving image 304a and the captured frame in the interpolated moving image 304b. Thus, the three-dimensional object generator 204 generates the three-dimensional objects at each of the timings t11, t21..., t1n, and t2n.

The moving image processing unit 206 generates the moving image that includes the three dimensional objects generated at the timing t11, t21, ..., t1n, and t2n in its each frame, so that the moving image processing unit 206 generates the three-dimensional moving image 306 of which frame rate is twice as high as that of the captured moving image 302a and that of the captured moving image 302b.

If the cameras 102a-b obtain the captured frames at the same timing, the interpolated frame generator 202 will generate the interpolating images 304a-b, in which the interpolated image is inserted at the same timing. In this case, the three-dimensional object generator 204 will generate the three-dimensional object by using only the interpolated frames included in the interpolated moving images 304a-b. If the three-dimensional object is generated by using only the interpolated frames when the movement of the subject is too rapid, it is sometimes impossible to represent the subject correctly. However, according to this example, since the three-dimensional object is always generated by using the captured frame, it is possible to keep up with the movement of the subject and also possible to generate the three-dimensional object. Therefore, according to this example, the three-dimensional moving image 306 having high frame rate can be generated appropriately.

In another example, the three-dimensional moving image 306 may generate a new frame of the three-dimensional moving image 306 based on the captured frame in the captured moving image 302a or the captured frame in the captured moving image 302b, and the forepassed frames of the three-dimensional moving image 306. For example, the moving image processing unit 206 may generate the frame of three-dimensional moving image 306 at the timing t13, based on both the captured frame in the captured moving image 302a at the timing t13 and the frames of the three-dimensional moving image 306 at the timings before the t22. In this case, the moving image processing unit 206 generates the initial frame of the three-dimensional moving image 306 at the timing t13 using the motion compensation based on the frames of the three-dimensional moving image 306, so that the moving image processing unit 206 corrects the initial frame based on the captured frame of the captured moving image 302a at the timing t13.

Alternatively, the moving image processing unit 206 may generate the three-dimensional moving image 306 directly based on each of the captured frame in the captured moving image 302a and the captured moving image 302b, not using the interpolated moving images 304a-b. For example, the moving image processing unit 206 may generate the frame of the three-dimensional moving image 306 at the timing t21, based on both the captured frame of the captured moving image 302a at the timing t11 and the captured frame of the captured moving image 302b at the timing t21.

Moreover, the moving image processing unit 206 may receive an input of a viewpoint from which the automobile 20 is observed. The moving image processing unit 206 generates the three-dimensional moving image when the automobile 20 is observed from this viewpoint. In this case, the moving image processing unit 206 receives the three-dimensional objects sequentially from the three-dimensional object generator 204, so that the moving image processing unit 206 can convert the received objects to the images seen from the viewpoint, by using well-known method. Thus, in addition to the two viewpoints corresponding to the cameras 102a-b, the moving image of the subject seen from the other viewpoints can be generated, although the moving image generating apparatus 100 includes only two cameras 102a-b. Accordingly, it is possible to generate the multichannel video stream in which a plurality of viewpoints for observing the subjects can be selected.

Figure 4:
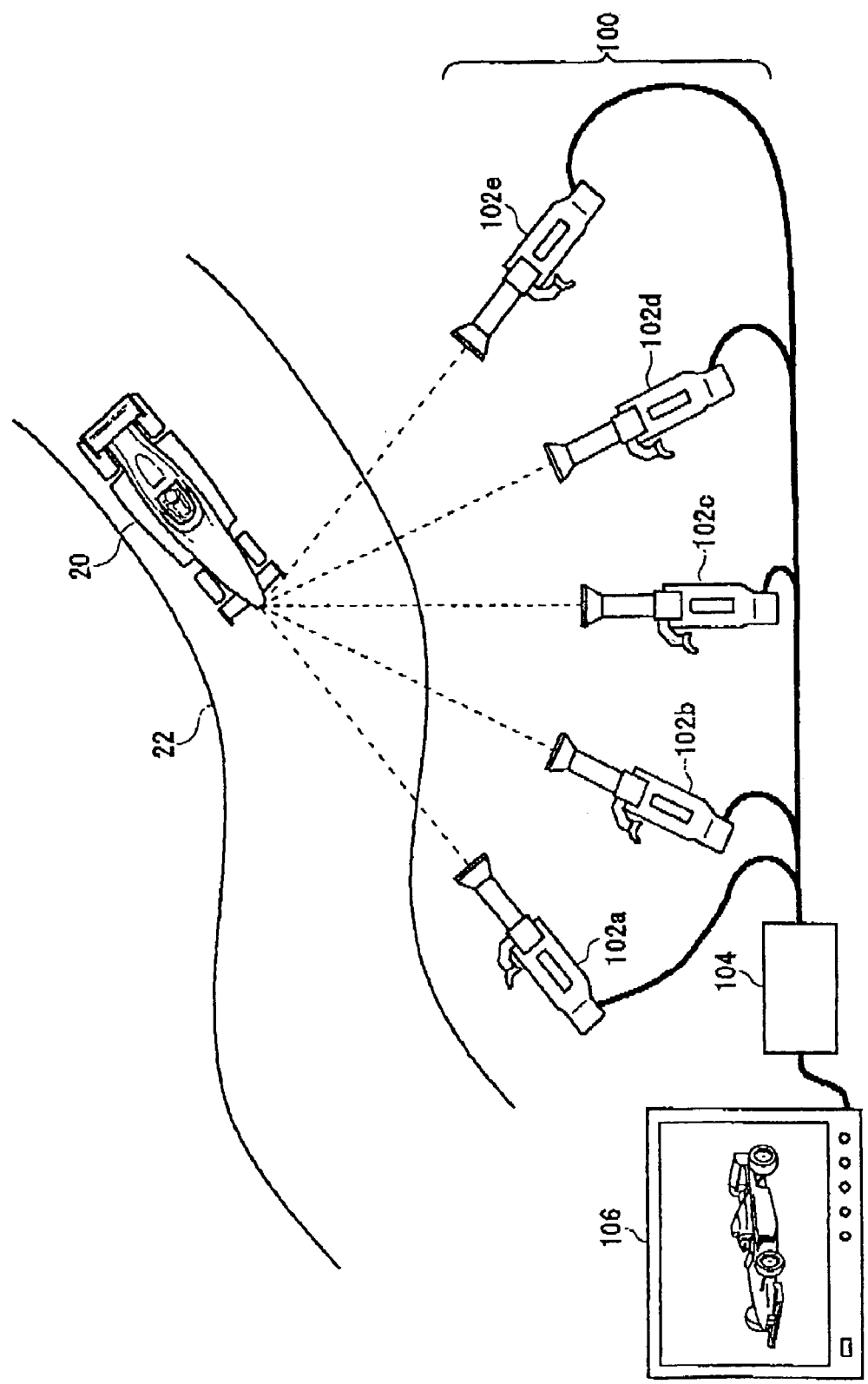
FIG. 4 is another example of the overview of the moving image generating apparatus 100.

FIG. 4 is another example of the overview of the moving image generating apparatus 100. Components in FIG. 4 bearing the same reference numerals as those in FIG. 1 will not be described because they have the same or similar functions as those in FIG. 1. In this example, the moving image generating apparatus 100 includes five cameras 102a-e. Each of the cameras 102a-e captures the automobile 20 at each timing. In this case, while one of the cameras 102a-e captures the automobile 20 as a subject, the other cameras 102 do not capture the subject. Therefore, each of the cameras 102a-e generates the captured moving images at such timing that is complementary to the timing when each of the captured moving images is generated by the other cameras 102. Each of the cameras 102a-e is provided to each position of which relative positions with respect to other cameras are predetermined. In this example, the camera 102a and the camera 102e are provided so that the camera 102a and the camera 102e sandwich the other cameras 102b-d.

The three-dimensional moving image generator 104 generate the three-dimensional image, of which frame rate is five times as high as that of the captured moving image, by using the method described below, and then supplies them to the display 106. The display 106 displays the three-dimensional moving images received from the three-dimensional moving image generator 104. According to this example, it is possible to generate the three-dimensional moving image having a high frame rate appropriately.

Figure 5:
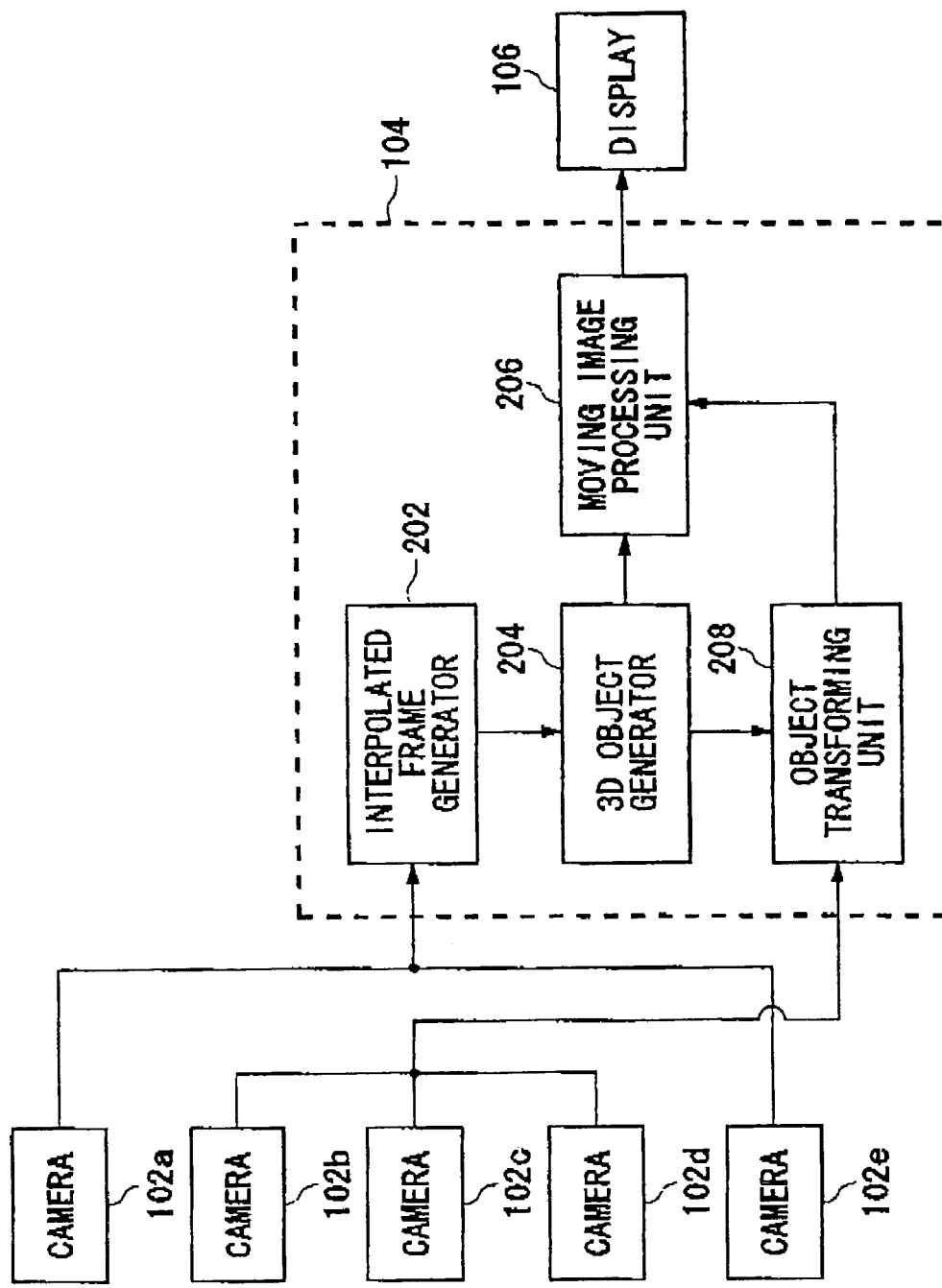
FIG. 5 is an example of the detailed configuration of the moving image generating apparatus 100 explained in FIG. 4.

FIG. 5 is an example of the detailed configuration of the moving image generating apparatus 100 explained with reference to FIG. 4. Components in FIG. 5 beating the same reference numerals as those in FIG. 5 will not be described because they have the same or similar functions as those in FIG. 5. In this example, the three-dimensional moving image generator 104 includes the interpolated frame generator 202, the three-dimensional object generator 204, the moving image processing unit 206 and an object transforming unit 208.

The interpolated frame generator 202 adds the interpolated frames to the captured moving images received from the camera 102a and the camera 102e, so that the interpolated frame generator 202 generates two interpolated moving images, and then supplies them to the three-dimensional object generator 204. The three-dimensional object generator 204 generates the three-dimensional objects based on the two interpolated moving images. Therefore, the three-dimensional object generator 204 generates the three-dimensional object of the subject based on the captured moving images generated by the two cameras 102. The three-dimensional object generator 204 and the three-dimensional object generator 204 may generate the three-dimensional object, based on the captured moving images received from equal to or more than three cameras 102.

The object transforming unit 208 transforms three-dimensional object received from the three-dimensional object generator 204 based on each of the frames of the captured moving images received from the cameras 102b-d. For example, the object transforming unit 208 transforms the three-dimensional object based on each relative positions of the cameras 102b-d with respect to the camera 102a and the camera 102e, and based on each of the captured frames. Thus, the object transforming unit 208 generates the three-dimensional object of the subject at each timing when each captured frame is obtained, corresponding to each of the captured frames received from the cameras 102b-d. The object transforming unit 208 supplies the generated three-dimensional object to the moving image processing unit 206.

The moving image processing unit 206 generates the three-dimensional moving image based on the three-dimensional objects received from the three-dimensional object generator 204 and the object transforming unit 208. Thus, the moving image processing unit 206 generates the three-dimensional moving image of which frame rate is higher than that of each of the cameras 102b-d. The moving image processing unit 206 may generate the three-dimensional moving image having a frame rate that is equal to a frame rate of the captured moving image multiplied by the number of the cameras 102a-e. According to this example, the three-dimensional moving image with a high frame rate can be generated appropriately.

Figure 6:
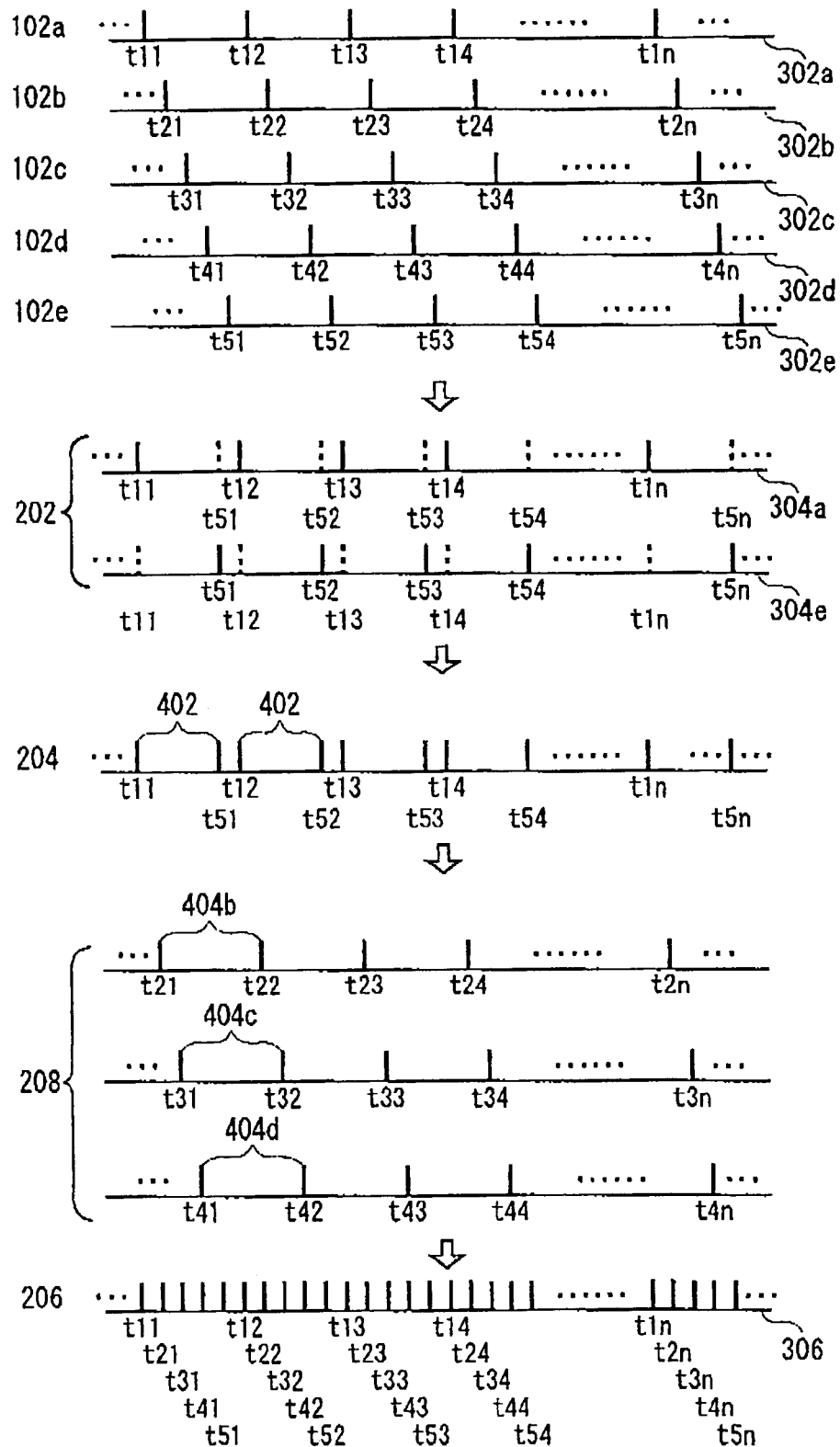
FIG. 6 is an explanatory drawing showing an example of the operation of the moving image generating apparatus 100 explained in FIGS. 4 and 5.

FIG. 6 is an explanatory drawing showing an example of the operation of the moving image generating apparatus 100 explained with reference to FIGS. 4 and 5. In this example, the camera 102a captures the subject intermittently by obtaining the captured frames at the timings repeated at regular intervals such as the timing t11, t12, . . . , and t1n, shown with continuous line in the drawing, so that the camera 102a generates the captured moving image 302a. In a similar way, the cameras 102be generate the captured moving images 302b-e by obtaining the captured frames at the timings t21, . . . , and t2n.

The interpolated frame generator 202 adds each interpolated frame among the captured frames in the captured moving images 302a and 302e, so that the interpolated frame generator 202 generates the interpolated moving images 304a and 304e. In this case, the interpolated frame generator 202 adds the interpolated frame to the captured moving image 302a at the timings when the captured frames in the captured moving image 302e are captured, so that the interpolated frame generator 202 generates the interpolated moving image 304a. For example, the captured moving image 302 adds the interpolated frames to the timings t51, t52, . . . , and t5n, in the captured moving image 304a. In addition, the interpolated frame generator 202 adds the interpolated frame to the captured moving image 302e at the timings when the captured frames in the captured moving image 302a are captured, so that the interpolated frame generator 202 generates the interpolated moving image 304e. For example, the captured moving image 302 adds the interpolated frames at the timings t11, t12, . . . , and t1n, in the captured moving image 304e.

Next, the three-dimensional object generator 204 generates the three-dimensional objects 402 corresponding to each of the frames, based on each frame of the interpolated moving images 304a and 304b. For example, the three-dimensional object generator 204 generates the three-dimensional objects 402, based on the captured frame in the interpolated moving image 304a and the interpolated frame in the interpolated moving image 304b at the same timing. The three-dimensional object generator 204 also generates the three-dimensional objects 402, based on the interpolated frame in the interpolated moving image 304a and the captured frame in the interpolated moving image 304b at the same timing. Therefore, the three-dimensional object generator 204 generates the three-dimensional objects 402, showing the subject at the timings t11, t51, t12, . . . , t1n, and t5n.

Next, the object transforming unit 208 transforms the three-dimensional object 402 based on each of the captured moving image 302b-d, so that the object transforming unit 208 generates the transformed three-dimensional objects 404b-d. The object transforming unit 208 may transform the three-dimensional object 402 based on the camera 102e and each relative position of the cameras 102b-d with respect to the camera 102a. The object transforming unit 208 may generate the three-dimensional objects 402, and 404b-d showing the subject seen from the same position, by compensating the difference between the positions of the cameras 102a-e when the subject is defined as a reference position.

The object transforming unit 208 transforms the three-dimensional object 402 at the timing t11 and/or t51 based on the captured frame in the captured moving image 302b at the timing t21, so that the object transforming unit 208 generates the three-dimensional object 404b at the timing t21. In this case, the object transforming unit 208 may generate a three-dimensional object which interpolates between one of the three-dimensional objects 402 at the timing t11 and one of the three-dimensional objects 402 at the timing 51, and then transform this three-dimensional object based on the captured frame in the captured moving image 302b at the timing 21.

Next, the moving image processing unit 206 generates three-dimensional moving image 306 by arranging the three-dimensional object 402, and the three-dimensional object 404b-d sequentially. Thus, the moving image processing unit 206 generates the three-dimensional moving image 306 having a frame rate that is five times as high as each frame rate of the captured moving images 302a-e. According to this example, the three-dimensional moving image having the high frame rate can be generated appropriately.

Alternatively, in another example, the camera 102a and the camera 102e may capture the subject at the same timing. In this case, since the camera 102b-d capture the subject at the timing that is different from each timing of the cameras 102a-b, the three-dimensional moving image having the high frame rate can be generated appropriately.

In addition, according to this example, the three-dimensional moving image with high frame rate can be generated from the captured moving image 302 with low frame late. Therefore, when it is needed to deliver the three-dimensional moving image 306 through a transmission line of which transmission quality is restricted, according this present invention, the moving image generating apparatus 100 may deliver the three-dimensional moving image 306 having low frame rate. In this case, the moving image generating apparatus 100 can use the extra capacity of transmission caused as the result of reducing the fire rate, in order to increase the resolution of the three-dimensional moving image, so that the moving image generating apparatus 100 can deliver the high quality three-dimensional moving image 306.

Figure 7:
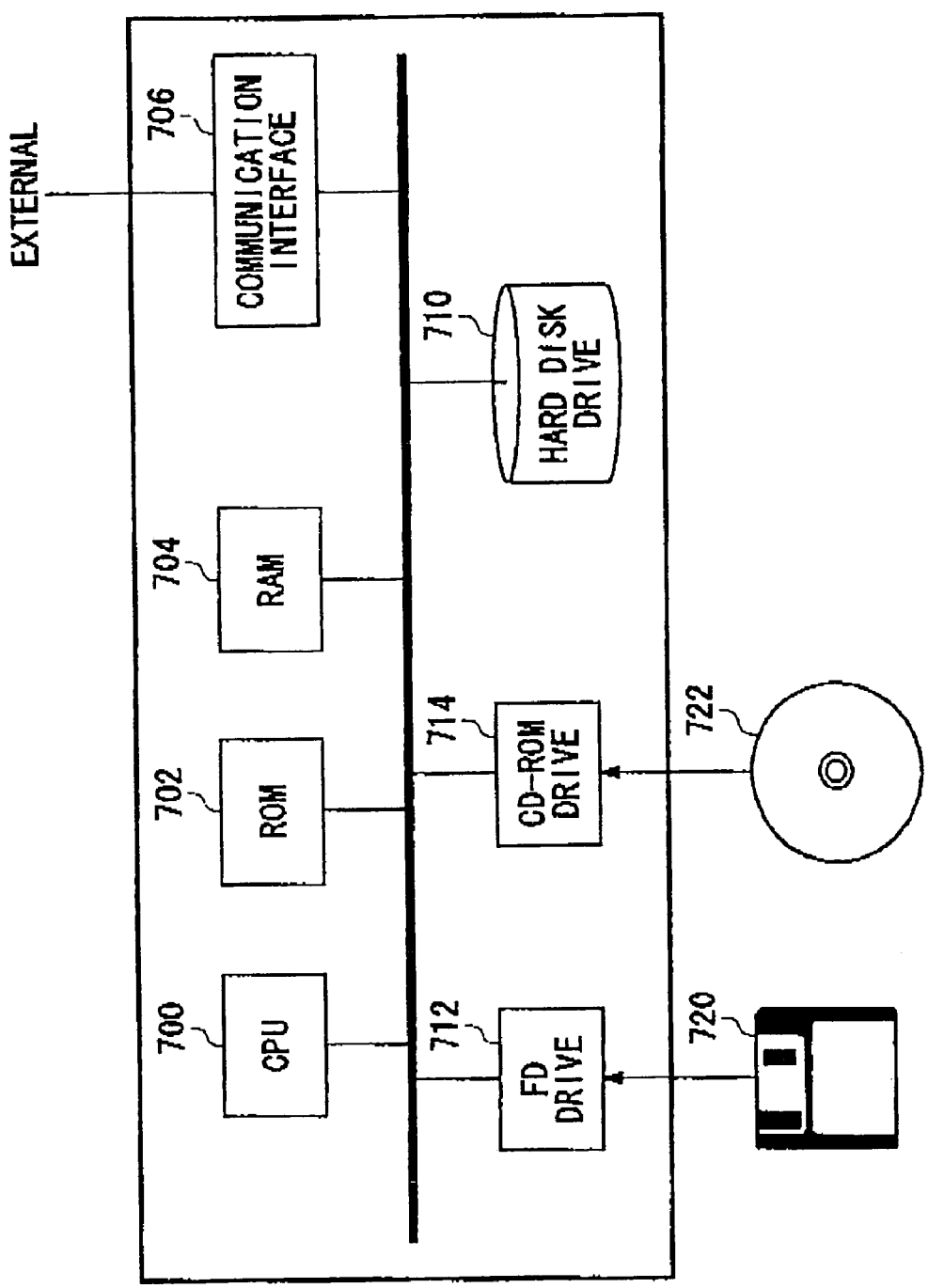
FIG. 7 is an example of the configuration of the computer 500 for controlling the moving image generating apparatus 100.

FIG. 7 is an example of the configuration of the computer 500 for controlling the moving image generating apparatus 100. In this example, the computer 500 stores program that makes the moving image generating apparatus 100 to operate as the moving image generating apparatus 100, as described in FIGS. 1-6. In addition, the computer 500 may operate as the three-dimensional moving image generator 104 in the moving image generating apparatus 100.

The computer 500 includes a CPU 700, a ROM 702, a RAM 704, a communication interface 706, a hard disk drive 710, a flexible disk drive 712, and a CD-ROM drive 714. The CPU 700 operates based on the program stored in the ROM 702, RAM 704, the hard disk drive 710, the flexible disk drive 712 and/or the CD-ROM drive 714.

The program includes a two-dimensional moving image generating module and a three-dimensional moving image generating module. These programs or modules for operating the computer 500 may make the CPU 700 to operate as the three-dimensional object generator 204, the moving image processing unit 206 and the object transforming unit 208, as explained in FIGS. 1-6.

The communication interface 706 communicates with each of the cameras 102, receives the status information of the cameras 102 and the images that are captured, and transmits the control signal for controlling the cameras 102. Each of the hard disk drive 710, the ROM 702, and the RAM 704 is an example of the storing apparatus, and stores configuration information and the program to operate the CPU 700. A recording medium such as the flexible disk 720 or the CD-ROM 722 may store the program.

When the flexible disk 720 stores the program, the flexible disk drive 712 reads the program from the flexible disk 720 and supplies the program to the CPU 700. When the CD-ROM 722 stores the program, the CD-ROM 722 reads the program from the CD-ROM 722 and supplies the program to the CPU 700.

The program may be read from the recording medium and provided to the RAM 704 directly and then executed. Alternatively, the program may be installed to the hard disk drive 710 and then, may be read to the RAM 704 and executed. In addition, the program may be stored in only recording medium or may be stored in a plurality of recording medium. Moreover, the program stored in the recording medium may provide each of the facility of the present invention, cooperating with the operating system. For example, the program may request the operating system to operates all facilities or some of the facilities, and then, provides the facilities in response to the operating system.

It is possible to use an optical record medium such as DVD or PD, a magneto-optical record medium such as Minidisk, a tape medium, a magnetic record medium or a semiconductor memory such as an IC card or a Miniature Card as a record medium instead of the flexible disk 712 or the CD-ROM 714. A storage device, such as a hard disk or a RAM in a server system on a dedicated communication network or the Internet, may be used as a record medium.

Figure 8:
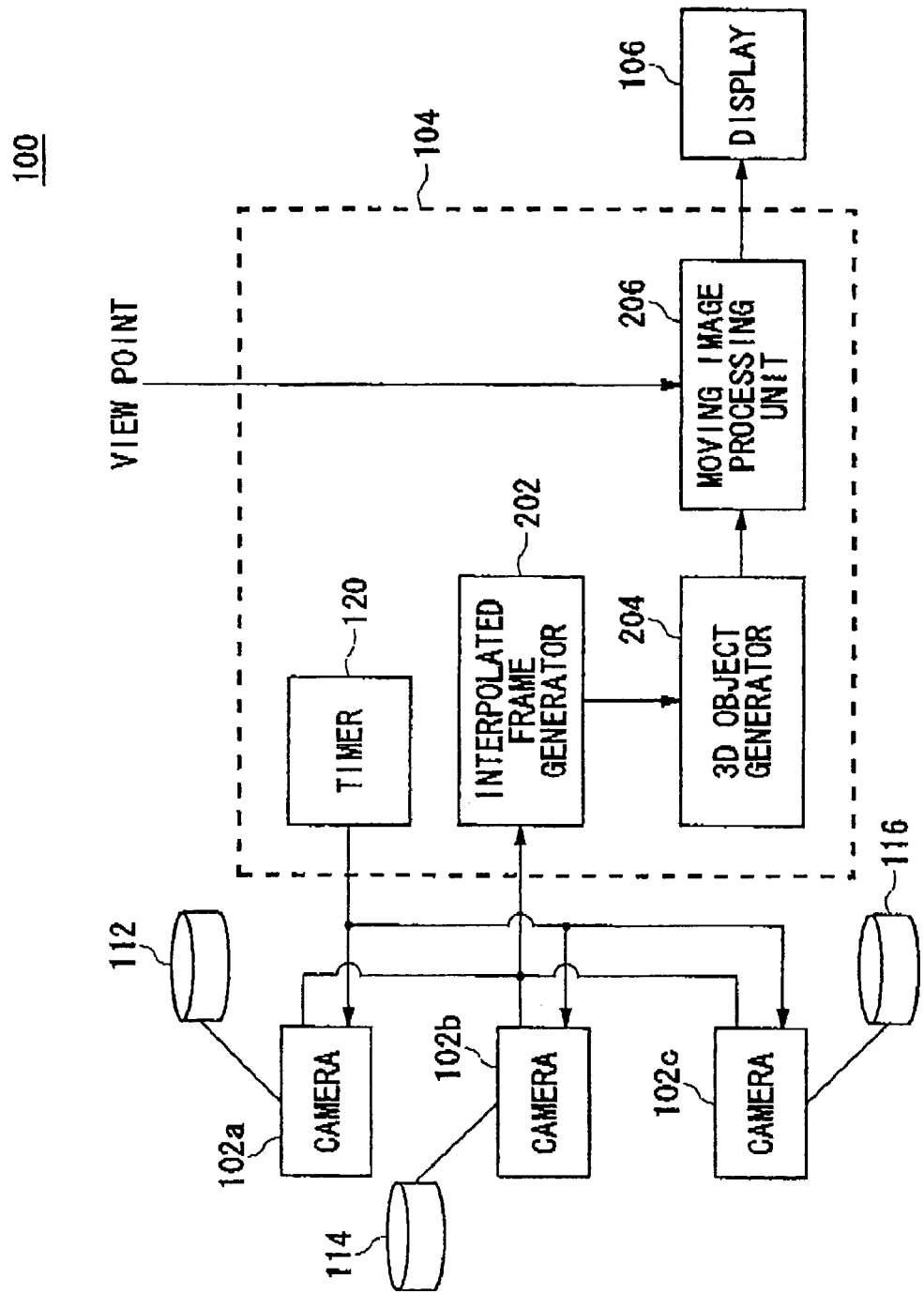
FIG. 8 is another configuration of the moving image generating apparatus 100.

FIG. 8 is another configuration of the moving image generating apparatus 100. In the moving image generating apparatus 100 shown in FIG. 8, components corresponding to the moving image generating apparatus 100 shown in FIG. 2 are assigned by the same reference numerals and will not be described. The moving image generating apparatus 100 shown in FIG. 8, includes the camera 102a, the camera 102b, and the camera 102c as an example. The moving image generating apparatus 100 shown in FIG. 8 includes a timer 120 for announcing a time to the cameras 102a-c. Since the timer 120 announces a reference time to the cameras 102a-c, each of the cameras 102a-c can capture intermittently at each timing with a predetermined interval time. In this example, the timer 120 is an example of the time announcing unit.

Moreover, the moving image generating apparatus 100 includes an image storing unit 112, an image storing unit 114 and an image storing unit 116, corresponding to the cameras 102a-c. The image storing unit 112 is connected to the camera 102a. Thus, the image storing unit 112 stores the two-dimensional captured moving image obtained by the camera 102a. In a similar way, the image storing unit 114 and the image storing unit 116 are connected to the camera 102b and the camera 102c respectively. Thus, the image storing unit 114 and the image storing unit 116 store the two-dimensional captured moving images obtained by the cameras 102b-c. A hard disk is an example of each of the image storing units 112, 114 and 116. However, the image storing units 112, 14, and 116 may be any recording medium, in place of the hard disk.

Figure 9:
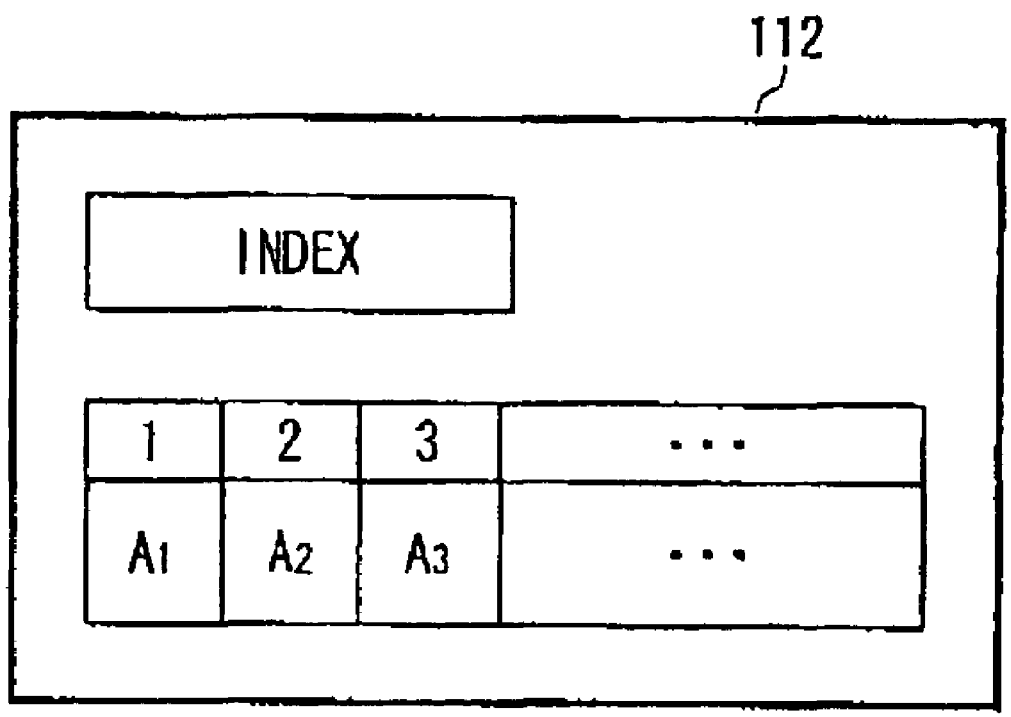
FIG. 9 is a schematic diagram showing a data structure stored in the image storing unit 112.

FIG. 9 is a schematic diagram showing a data structure stored in the image storing unit 112. Since the image storing unit 114 and image storing unit 116 have the same data structure as the image storing unit 112, the explanation about the image storing unit 114 and the image storing unit 116 will be omitted. The image storing unit 112 stores both index data in which information about the cameras 102 is written and the captured frames obtained by the camera 102a, in an order of the timings when the captured frames were captured, as the two-dimensional captured moving images captured by the camera 102a.

The image storing unit 112 stores serial numbers of the camera 102a-c which are connected to the moving image generating apparatus 100, a positional relationship between the subject and the camera 102a (for example, distance and angle), and time informations, as index data. The image storing unit 112 stores a timing announced by the image storing unit 130 at the start time of capturing, a frame rate, a length of recording, and a time difference between a capturing timing of the camera 102b and a capturing time of the camera 102c, as the time informations. Alternatively, the image storing unit 112 may stores information showing the relative positions of the camera 102a with respect to the camera 102b and the camera 102c, in place of the information of the positional relationship between the subject and the camera 102a.

As described above, since the image storing unit 112 stores the index data and captured frames in an order of the capturing time, it is possible to read the two-dimensional captured moving image of the camera 102a later and replay the two-dimensional captured moving image. In addition, the moving image generating apparatus 100 can generate the three-dimensional moving image again later, by reading the two-dimensional captured moving image from the image storing unit 114 and the image storing unit 116, which are connected to the camera 102b and the camera 102c respectively.

Figure 10:
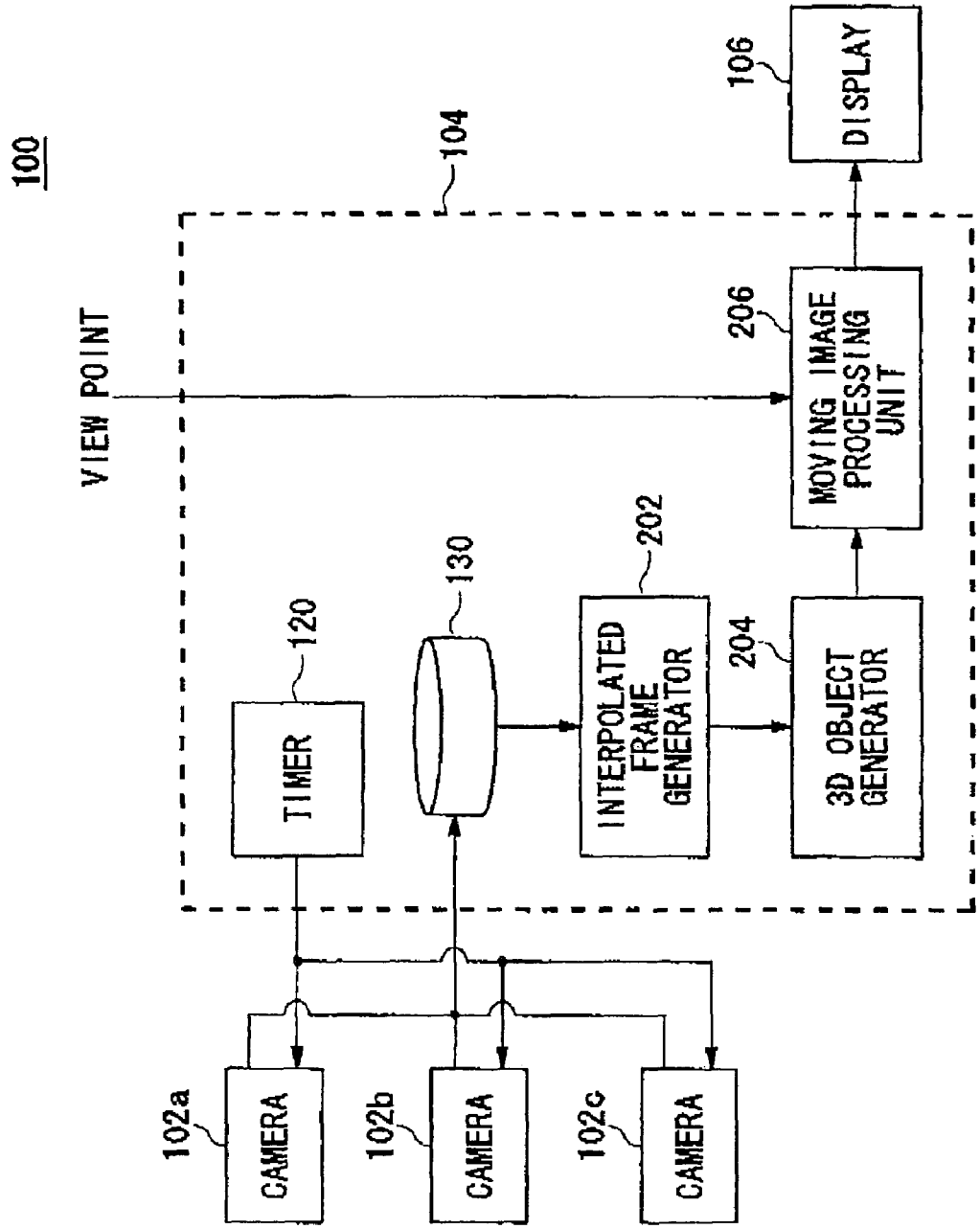
FIG. 10 is another configuration of the moving image generating apparatus 100.

FIG. 10 is another configuration of the moving image generating apparatus 100. In the moving image generating apparatus 100 shown in FIG. 10, components corresponding to the moving image generating apparatus 100 shown in FIG. 8 are assigned by the same reference numerals and will not be described. The moving image generating apparatus 100 shown in FIG. 10 includes the cameral 102a, the camera 102b, the camera 102c and the timer 120, in a similar to the moving image generating apparatus 100 shown in FIG. 8.

The moving image generating apparatus 100 shown in FIG. 10 further includes an image storing unit 130, connected to the camera 102a-c. Accordingly, the image storing unit 130 stores the two-dimensional captured moving images captured by each of the cameras 102a-c.

FIG. 11 is a schematic drawing showing a data structure stored in the image storing unit 130. The image storing unit 130 stores index data in a similar way to the image storing unit 112. In addition, the image storing unit 130 stores the captured frames in an order of the timings when the captured frames were captured by the cameras 102a-c in every the cameras 102a-c. In FIG. 11, each of the captured frames obtained by the cameras 102a-c is represented as A, B and C. As shown in FIG. 11, the image storing unit 130 stores the captured frames of the camera 102a in an order of the capturing timing of the camera 102a. Similarly the image storing unit 130 stores the captured frames of the cameras 102b-c, in an order of the capturing timing of the camera 102a and in an order of the capturing timings of the camera 102c. Here, the capturing timing is a timing when the camera captures the subject. The image storing unit 130 supplies the stored two-dimensional captured moving image to the interpolated frame generator 202, according to the request of the interpolated frame generator 202.

As described above, since the image storing unit 112 stores the two-dimensional captured moving images of the cameras 102a-c in every cameras 102a-c, it is possible to read the two-dimensional captured moving images of the cameras 102a-c, without sorting them. Therefore, it is possible to replay the two-dimensional captured moving image in every cameras 102a-c easily.

Figure 12:
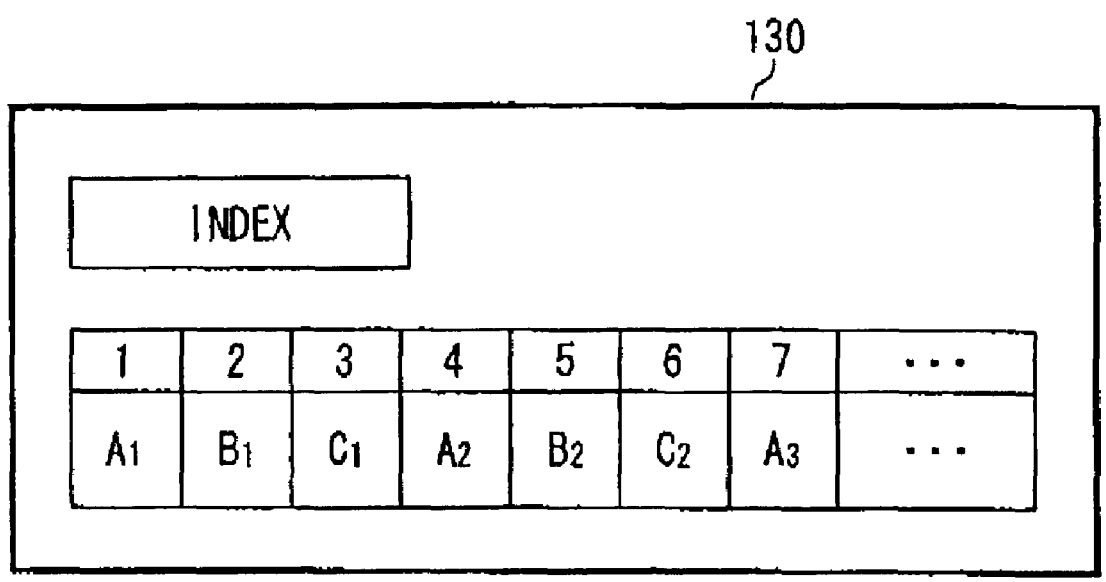
FIG. 12 is a schematic diagram showing another data structure stored in the image storing unit 130.

FIG. 12 is a schematic diagram showing another data structure stored in the image storing unit 130. The image storing unit 130 shown in FIG. 12 stores index data in a similar way to the image storing unit 130 shown in FIG. 11. In addition, the image storing unit 130 shown in FIG. 12 stores the two-dimensional captured moving images of the cameras 102a-c, in an order of the timings when the cameras 102a-c capture. For example, as shown in FIG. 12, the image storing unit 130 stores the captured frames periodically in an order of A, B, and C, in a case the cameras 102a-c capture the two-dimensional captured moving image in the order of the camera 102a, the camera 102b and the camera 102c.

As described above, since the image storing unit 130 stores the two-dimensional captured moving images with index in the order of the timings when the cameras 102a-c capture, the data structure becomes simple. Therefore, when the interpolated frame generator 202 requests the captured frames, it is not necessary for the image storing unit 130 to sort the frames, so that the time for reading the frames becomes short.

Although the present invention has been described by way of exemplary embodiments, it should be understood that those skilled in the art might make many changes and substitutions without departing from the spirit and the scope of the present invention which is defined only by the appended claims.

What is claimed is:

1. A moving image generating apparatus for generating three-dimensional moving image to display a subject as a three-dimensional object, comprising:
   a plurality of two-dimensional moving image generators, wherein each of said two-dimensional moving image generators is provided to a different position from each other, of which relative positions with respect to each of said two-dimensional moving image generators is predetermined respectively, and each of said two-dimensional moving image generators captures the subject at different timing intermittently and generates a two-dimensional captured moving image respectively, and
   a three-dimensional moving image generator operable to generate the three-dimensional moving image of which frame rate is higher than a frame rate of the two-dimensional captured moving image, based on both the relative positions of said plurality of two-dimensional moving image generators and the two-dimensional captured moving images generated by said two-dimensional moving image generators; and wherein
   said two-dimensional captured moving image includes a plurality of captured frames which is obtained intermittently and sequentially,
   while one of said two-dimensional moving image generators captures two consecutive captured frames, another of said two-dimensional moving image generators capture one captured frame, and
   said three-dimensional moving image generator includes:
      an interpolated frame generator operable to generate an interpolated frame to be inserted between the two consecutive captured frames, by interpolating between the two captured frames obtained by said two-dimensional moving image generator;
      a three-dimensional object generator operable to generate a three-dimensional object of the subject, based on both the interpolated frame inserted between the two captured frames which are obtained by said two-dimensional moving image generator and the one captured frame obtained by said other two-dimensional moving image generators; and
      a moving image processing unit operable to generate the three-dimensional moving image based on the three-dimensional object received from said three-dimensional object generator sequentially.

2. The moving image generating apparatus as claimed in claim 1, further comprising:
   equal to or more than three of said two-dimensional moving image generators; and wherein
   each of said two-dimensional moving image generators captures the subject at each timing when the subject is not captured by the other two-dimensional moving image generators, so that each of said two-dimensional moving image generators generates the two-dimensional captured moving image at such timing that is complementary to the timing when each of the two-dimensional captured moving image is generated by said other two-dimensional moving image generators; and
   said three-dimensional moving image generator generates the three-dimensional moving image having a frame rate that is equal to a frame rate of the two-dimensional captured moving image multiplied by the number of the two-dimensional moving image generators, based on the two-dimensional captured moving image received from said equal to or more than three two-dimensional moving image generators.

3. The moving image generating apparatus as claimed in claim 2, wherein
   said two-dimensional captured moving image includes a plurality of captured frames which is obtained intermittently and sequentially, and
   said three-dimensional moving image generator includes:
      an object transforming unit operable to generate the three-dimensional object of the subject at each of the timings when each of the captured frames is obtained, by transforming the three-dimensional object generated by said three-dimensional object generator, based on both relative positions of each of said two-dimensional moving image generators with respect to at least two of said two-dimensional moving image generators and each of the captured frames, corresponding to each of the captured frames generated by at least two of said two-dimensional moving image generators.

4. The moving image generating apparatus as claimed in claim 1, wherein said moving image processing unit receives an input of a viewpoint from which the subject is observed, and generates the three-dimensional moving image when the subjects is observed from the viewpoint.

5. The moving image generating apparatus as claimed in claim 1, further comprising:
an image storing unit operable to store the two-dimensional captured moving image generated by said two-dimensional moving image generators, wherein said image storing unit stores the two-dimensional captured moving images, in an order of the timings when said two-dimensional moving image generators capture, in every said two-dimensional moving image generator.

6. The moving image generating apparatus as claimed in claim 5, wherein said image storing unit is provided every said two-dimensional moving image generator, and further comprising:
a time announcing unit operable to announce time to said two-dimensional moving image generators.

7. The moving image generating apparatus as claimed in claim 1, further comprising:
an image storing unit operable to store the two-dimensional captured moving image generated by said two-dimensional moving image generators,. wherein said image storing unit stores the two-dimensional captured moving images of said two-dimensional moving image generators, in an order of the timings when said two-dimensional moving image generators capture.

8. The moving image generating apparatus as claimed in claim 7, further comprising:
a time announcing unit operable to announce a time to said two-dimensional moving image generators.

9. A moving image generating method for generating three-dimensional moving image to display a subject as a three-dimensional object, comprising steps of:
capturing the subject at different timing intermittently, thereby generating a two-dimensional captured moving image respectively by using a plurality of two-dimensional moving image generators, each of which is provided to a different position from each other, of which relative positions with respect to each of said two-dimensional moving image generators is predetermined respectively,
generating the three-dimensional moving image of which frame rate is higher than a frame rate of the two-dimensional captured moving image, based on both the relative positions of said plurality of two-dimensional moving image generators and the two-dimensional captured moving image generated by said two-dimensional moving image generators; and wherein
said two-dimensional captured moving image includes a plurality of captured frames which is obtained intermittently and sequentially,
while one of said two-dimensional moving image generators captures two consecutive captured frames, another of said two-dimensional moving image generators capture one captured frame, and
said three-dimensional moving image generator includes:
an interpolated frame generator operable to generate an interpolated frame to be inserted between the two consecutive captured frames, by interpolating between the two captured frames obtained by said two-dimensional moving image generator;
a three-dimensional object generator operable to generate a three-dimensional object of the subject, based on both the interpolated frame inserted between the two captured frames which are obtained by said two-dimensional moving image generator and the one captured frame obtained by said other two-dimensional moving image generators; and
a moving image processing unit operable to generate the three-dimensional moving image based on the three-dimensional object received from said three-dimensional object generator sequentially.

10. A computer readable recording medium having embodied thereon a computer program, which, when executed by a computer, causes the computer to execute a method for generating three-dimensional moving image to display a subject as a three-dimensional object, said method comprising:
a two-dimensional moving image generating module operable to capture the subject at different timing intermittently, thereby generating a two-dimensional captured moving image respectively by using a plurality of two-dimensional moving image generators, each of which is provided to a different position from each other, of which relative positions with respect to each of said two-dimensional moving image generators is predetermined respectively, and
a three-dimensional moving image generating module operable to generate the three-dimensional moving image of which frame rate is higher than a frame rate of the two-dimensional captured moving image, based on both the relative positions of said plurality of two-dimensional moving image generators and the two-dimensional captured moving image generated by said two-dimensional moving image generators; and wherein
said two-dimensional captured moving image includes a plurality of captured frames which is obtained intermittently and sequentially,
while one of said two-dimensional moving image generators captures two consecutive captured frames, another of said two-dimensional moving image generators capture one captured frame, and
said three-dimensional moving image generating module includes:
an interpolated frame generator operable to generate an interpolated frame to be inserted between the two consecutive captured frames, by interpolating between the two captured frames obtained by said two-dimensional moving image generator;
a three-dimensional object generator operable to generate a three-dimensional object of the subject, based on both the interpolated frame inserted between the two captured frames which are obtained by said two-dimensional moving image generator and the one captured frame obtained by said other two-dimensional moving image generators; and
a moving image processing unit operable to generate the three-dimensional moving image based on the three-dimensional object received from said three-dimensional object generator sequentially.

11. A moving image generating apparatus for generating three-dimensional moving image of a subject, comprising:
a plurality of two-dimensional moving image generators, and
a three-dimensional moving image generator,
wherein each of said two-dimensional moving image generators is located in a distinct and predetermined position, and
wherein each of said two-dimensional moving image generators captures the subject intermittently, at a timing different from the other two-dimensional moving image generators, in a moving image, and
wherein said three-dimensional moving image generator is operable to generate the three-dimensional moving image with a frame rate higher than a frame rate of the two-dimensional captured moving image, based on both the relative positions of said plurality of two-dimensional moving image generators and the two-dimensional captured moving image generated by said two-dimensional moving image generators; and wherein said two-dimensional captured moving image includes a plurality of captured frames which is obtained intermittently and sequentially, while one of said two-dimensional moving image generators captures two consecutive captured frames, another of said two-dimensional moving image generators capture one captured frame, and said three-dimensional moving image generator includes:
an interpolated frame generator operable to generate an interpolated frame to be inserted between the two consecutive captured frames, by interpolating between the two captured frames obtained by said two-dimensional moving image generator;
a three-dimensional object generator operable to generate a three-dimensional object of the subject, based on both the interpolated frame inserted between the two captured frames which are obtained by said two-dimensional moving image generator and the one captured frame obtained by said other two-dimensional moving image generators; and
a moving image processing unit operable to generate the three-dimensional moving image based on the three-dimensional object received from said three-dimensional object generator sequentially.

12. The moving image generating apparatus as claimed in claim 11, wherein a three-dimensional image is generated for every time that any of said-dimensional moving image generators captures the subject intermittently.

13. The method of claim 9, wherein the generating the three-dimensional moving image comprises:
for each respective image wherein the subject is captured by one of the plurality of two-dimensional moving image generators, interpolating a corresponding image for each of the other two-dimensional moving image generators.

14. The method of claim 13, wherein, interpolating a corresponding image for each of the other two-dimensional moving image generators comprises:
for each interpolated image, adding interpolated frames to the video sequence of a camera in the timing locations of the captured frames of another camera.

15. The moving image generating apparatus as claimed in claim 1, wherein both the interpolated frame inserted between the two captured frames which are obtained by said two-dimensional moving image generator and the one captured frame obtained by said other two-dimensional moving image generators represent the subject at the same point in time.

16. The moving image generating apparatus as claimed in claim 1,
wherein one of said two-dimensional moving image generators captures a captured two-dimensional frame of the subject at a point in time;
wherein said interpolated frame generator generates a two-dimensional interpolated frame representing the subject at said point in time for another of said plurality of two-dimensional moving image generators; and
wherein said three-dimensional moving image generator generates a three-dimensional object of the subject based on said captured two-dimensional frame and said two-dimensional interpolated frame, each of which represent the subject at said point in time.

17. The moving image generating apparatus as claimed in claim 16, wherein said three-dimensional moving image generator generates a plurality of said three-dimensional objects representing said subject at a plurality of said points in time based on a plurality of two-dimensional frames captured respectively by respective two-dimensional moving image generators, together with respective two-dimensional interpolated frames, and
wherein said three-dimensional moving image generator generates a three-dimensional moving image based on said plurality of three-dimensional objects.

18. The moving image generating apparatus as claimed in claim 16,
wherein the interpolated frame generator generates said two-dimensional interpolated frame based on: adding interpolated frames to the video sequence of a camera in the timing locations of the captured frames of another camera.

19. The moving image generating apparatus as claimed in claim 17,
wherein the interpolated frame generator generates said two-dimensional interpolated frame based on: adding interpolated frames to the video sequence of a camera in the timing locations of the captured frames of another camera.

20. The apparatus of claim 1 further comprising a display means for reproducing the three dimensional moving image on a screen of the object imaged by the two dimensional moving image generators.

* * * * *